United States Patent [19]

Meuly

[11] 3,923,997
[45] Dec. 2, 1975

[54] PROCESS FOR REPELLING DOGS AND CATS FROM A SELECTED AREA OR FROM EACH OTHER USING γ-N-ALKYL-γ-BUTYROLACTONES AND δ-N-ALKYL-δ-VALEROLACTONES

[75] Inventor: Walter C. Meuly, Piscataway Township, Middlesex County, N.J.

[73] Assignee: Rhodia Inc., New York, N.Y.

[22] Filed: Oct. 23, 1973

[21] Appl. No.: 408,332

Related U.S. Application Data

[63] Continuation of Ser. No. 142,395, May 11, 1971, abandoned.

[52] U.S. Cl. ................................ 424/279; 424/45
[51] Int. Cl.$^2$ ............................................ A01N 9/28
[58] Field of Search .............. 424/45, 279, DIG. 10; 260/343.5, 47; 252/522

[56] References Cited
UNITED STATES PATENTS

| | | | |
|---|---|---|---|
| 3,054,804 | 9/1962 | Swern et al. | 260/343.6 |
| 3,297,536 | 1/1967 | Baron | 424/47 |

FOREIGN PATENTS OR APPLICATIONS

| | | | |
|---|---|---|---|
| 1,298,975 | 7/1969 | Germany | 260/343.6 |

OTHER PUBLICATIONS

Chem. Abst., Vol. 49, (1955), p. 1963a.
Chem. Abst., Vol. 49, (1963), p. 1226sh.
The Condensed Chem. Dictionary, (1956), pp. 148 & 287.
Bedoukian, Perfumery & Flavoring Synthetics pp. 226–232 & 325, (1967).

*Primary Examiner*—Sam Rosen
*Assistant Examiner*—Allen J. Robinson

[57] ABSTRACT

An anti-mating composition is provided for dogs and other domestic animals based on a γ-n-alkyl-γ-butyrolactone and/or a δ-n-alkyl-δ-valerolactone. The composition may also serve generally as a repellent for animals.

A process is also provided for inhibiting dogs from mating, as well as other domestic animals, by applying to the area or to the animal a γ-n-alkyl-γ-butyrolactone and/or a δ-n-alkyl-δ-valerolactone. A process for repelling generally such animals from areas to be protected is also provided, by applying the compound to such areas.

12 Claims, No Drawings

PROCESS FOR REPELLING DOGS AND CATS FROM A SELECTED AREA OR FROM EACH OTHER USING γ-N-ALKYL-γ-BUTYROLACTONES AND δ-N-ALKYL-δ-VALEROLACTONES

This is a continuation of application Ser. No. 142,395 filed May 11, 1971 and now abandoned.

It is of considerable economic importance to deter animals from damaging or destroying certain areas, objects or surfaces, especially when fencing or other physical restraints are inadequate. Exemplary are the annoying and costly depredations by wild animals, such as the girdling of trees and shrubs by deer, the destruction of vegetables and flowers by rabbits, the destruction of cable insulation by rodents, and destruction of food supplies by rats. Even domestic pets can cause considerable damage to the interior and exterior of homes and gardens. Rugs and furniture may be attacked, soiled and damaged. Plants, shrubs and trees, especially evergreens, may suffer from the effects of excrement. Sidewalks and store fronts can be fouled and malodors arise that are difficult to control.

In addition, uncontrolled breeding during the female breeding period is very undesirable, especially in the case of dogs, as it leads to both excessive offspring and mongrelization by pure-bred animals. The sexual behavior of dogs and probably other animals is controlled largely by odor stimuli. The male responds to the odor of a female in heat. While the female is in breeding condition, the glands of the vagina secrete a mucous substance having a typical odor which stimulates the male. Hafez, Int. Congress on Animal Reproduction and Artificial Insemination 1964, vol. 2, page 7, reports that the materials responsible are not identified in any species. David, Modern Dog Encyclopaedia 1958, page 505, asserts that the initial attraction is partly odor and partly sight. In any case, it has been considered possible to overcome the effect by modifying or masking the sexual odor emitted by the female, through the application of another odor which has the effect of inhibiting the male sex stimulus. For this purpose, odorous anti-mating products have been proposed.

At the present time, due to insufficient information, there is no way of determining in advance the anti-mating and/or repellent characteristics of a given organic compound. The results are based entirely on empirical or trial-and-error experimentation. Odors pleasing to humans may be either repellent to animals, or ineffective entirely, and vice versa. Unpleasant odors which may repel animals may be completely ineffective as anti-mating agents. Moreover, a compound repellent to one animal may not be repellent to another.

Many types of animal repellents have been proposed that impart a bad odor to the object or area to be protected, and thereby repel the animal. The substances that have been proposed possess a strong odor or taste that is unpleasant to humans, and presumably unpleasant to the animals, such as butyric acid, formic acid, formaldehyde, pyridines, allyl isothiocyanate, benzene hexachloride, bone oil, and iron sulfate. These materials are, however, generally unacceptable to humans because of their objectionable odor, toxicity and corrosiveness.

U.S. Pat. No. 2,811,478, dated Oct. 29, 1957, described alkyl 2-furoate tetrachloride as a repellent to rats, parakeets and insects.

U.S. Pat. No. 2,862,849, dated Dec. 2, 1958, suggested chlorinated phenol derivatives were effective rodent repellents.

German U.S. Pat. No. 1,248,361, describes a repulsive mixture for dogs, composed of formic acid, formaldehyde, butyric acid, ammonium sulfide, and water. Hydrogen sulfide is liberated to produce a foul odor, but this material is toxic, and the mixture is dangerous to use with pets.

Moore in an article in Aerosol Age, December 1966, pages 63–161, describes a number of dog and cat repellents, especially for indoors, based on methyl nonyl ketone obtained from natural oil of rue. This is volatile and expensive.

German Pat. No. 954,203 describes a mixture of oil of citronella, oil of anise, eucalyptus oil, and (optionally) polyacrylic or polymethacrylic acid, in acetone. The composition deposits a film which is said to be effective for fourteen days.

Fitzwater, the American Nurseryman, Vol. 104, No. 11, page 14 (1956) suggested that dogs and cats can be repelled by the odor of nicotine sulfate sprayed on bushes.

German Pat. No. 966,501 declares that iron sulfate is a good repellent for animals, to deter them from approaching or attacking trees, due to its repulsive taste.

There are a number of dog repellents available on the market, based primarily on aromatic oils which are thought to have an odor that is repulsive to dogs. One is based on a combination of citronella and lemongrass oils. Another, intended primarily for use outdoors, is based on mustard oil, allyl isothiocyanate, which is, of course, extremely toxic. Another is based on a combination of allyl isothiocyanate, alkyl pyridine, and oil of lemongrass. A further composition is based on menthol, thymol, oil of lemongrass, paradichlorobenzene, and allyl isothiocyanate. A composition indicated to be useful as a dog repellent for rugs is made up of quaternary ammonium salts and thymol. Most of these rely on odor or taste or both, for their effect, and none is fully effective.

The dog anti-mating compositions available are also based on odorous compounds. One composition useful as a spray contains oil of lemongrass, citral, eucalyptol, geranium oil, methyl salicylate, and oil of lavender, and has a strong lemon odor. Another is based on potassium chlorophyllins. None is notably effective, as is shown below.

The efficacy of several available commercial canine repellents was evaluated by Huebner and reported in Veterinary Medicine/Small Animal Clinician, Oct. 1964, pages 1016–1020. The study concerned five commercial canine repellents acquired on the general market, and showed one to be approximately 79% effective, two to be about 42 to 65% effective, and two to be comparatively ineffective. The most effective composition was based on tobacco dust (93%), and small amounts of lemongrass oil, eucalyptol, citral, amyl acetate, geranium oil, methyl salicylate, oil of lavender, and inert ingredients. Compositions based on liquid animal bone oil, and on allyl isothiocyanate, bone oil, oil of sassafras, and paradichlorobenzene, were 42 to 65% effective. The comparatively ineffective compositions were based on oil of lemongrass and allyl isothiocyanate. The most significant factor is that none of these were fully effective, and and all were based on odorants.

In accordance with the invention, it has been determined that γ-n-alkyl-γ-butyrolactones and δ-n-alkyl-δ-valerolactones are anti-mating compounds for dogs and possibly other domestic animals, as well as repellents for domestic animals. These compounds are effective in very small amounts, and they possess odors pleasant to humans. The compounds qualify for the official Food and Drug Administration designation GRAS, generally regarded as safe. Since they are organic cyclic compounds free from acid groups, they are non-corrosive.

The terms "anti-mating" as used in this Specification and claims refers to the inhibition of a male dog or other animal from mating with a female of the same or different species. Since this is a form of repulsion, the terms "repel", "repelling" and "repellent" as used herein generally encompass an anti-mating effect, but they also include repellent effects of all kinds, deterring the animal from molesting not only animals of the opposite sex but also the objects and areas to which the compounds of the invention are applied.

The lactones falling within the invention are defined by the following formula:

I. 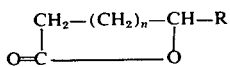

$n$ is a number from 1 to 2. R is a straight-chain (unbranched) alkyl group having from about two to about eight carbon atoms.

When $n$ is 1, the compound is a γ-n-alkyl-γ-butyrolactone having the formula:

II. 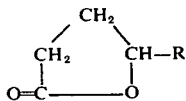

R is a straight chain alkyl group having from two to eight carbon atoms.

When $n$ is 2, the compound is a δ-n-alkyl-δ-valerolacetone having the formula:

III. 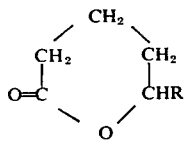

R is preferably a straight chain alkyl group having from two to seven carbon atoms.

The R groups are ethyl, n-propyl, n-butyl, n-amyl, n-hexyl, n-heptyl and n-octyl.

Exemplary compounds which can be employed in accordance with the invention alone or in admixture include γ-undecalactone(γ-n-heptyl-γ-butyrolactone), γ-n-hexyl-γ-butyrolactone, γ-n-octyl-γ-butyrolactone, γ-n-amyl-γ-butyrolactone, γ-n-butyl-γ-butyrolactone, γ-n-propyl-γ-butyrolactone, γ-ethyl-γ-butyrolactone, δ-undecalactone(δ-n-hexyl-δ-valerolactone), δ-n-heptyl-δ-valerolactone, and δ-n-amyl-δ-valerolactone.

All of the above compounds have in common an odor related to that of peach aldehyde, γ-undecalactone. Peach aldehyde does not occur in peaches, but many butyrolactones do.

These compounds can be applied undiluted, or substantially pure, to an animal from which other animals are to be repelled, or to an area or object to be made repellent to animals. The compounds are very effective in quite small amounts, even as low as from about 1 to about 100 g./100 sq. ft. Their odor is noticeable to humans at less than 0.001 ppm, and to dogs at lesser amounts. Since it is difficult to apply the compounds per se in such amounts, in general the compound is applied in greatly diluted form, in combination with an inert carrier, and in an amount within the range from about 0.05% to about 10% of the weight of the composition, including the carrier. The compounds of the invention have strong odors, and are preferably used in the minimum amount needed to obtain an effect, so as to avoid creating an overpowering odor, since it is neither necessary nor economical to use these compounds in such amounts.

Accordingly, in most instances, the lactones of the invention will be combined with a solid or liquid carrier or solvent or diluent or suspending material, in or on which it will be distributed, dissolved or dispersed. The solvent or carrier is, of course, inert.

Satisfactory inert liquid carriers or diluents include hydrocarbon fractions, such as kerosenes, petroleum naphthas, benzene, toluene, xylene, octane, cyclohexane, hexane, heptane and decane; aliphatic alcohols such as ethanol, propanol, methanol and butanol, ethylene glycol and propylene glycol; aliphatic ketones such as acetone and methyl ethyl ketone; aliphatic esters such as ethyl acetate, amyl acetate and propyl acetate; and chlorinated hydrocarbons such as chloroform, carbon tetrachloride, ethylene dichloride, and perchlorethylene, chlorobenzene, and dichlorobenzene.

The lactones can also be formulated as aqueous emulsions, in which case an emulsifying or wetting agent may be included. Solid carriers make it possible to apply the compounds as a dust. Exemplary inert carriers in finely divided particulate form include kieselguhr, diatomaceous earth, calcium carbonate, kaolin, attapulgite clay, montmorillonite clay, and silica.

A particularly advantageous composition is an aerosol composition in which the compound is combined with an inert diluent and/or propellant. Propellants which can be used include any volatile organic compound that has a boiling temperature well below room temperature at atmospheric pressure, and that is chemically inert. Thus, hydrocarbons such as propane, n-butane and isobutane can be employed, as well as halogenated hydrocarbons such as vinyl chloride, methyl bromide, dichlorodifluoromethane, 1,1-dichloro-1,1,2,2-tetrafluoroethane, 1-chloro-1,1-difluoroethane, 1,1-difluoroethane, chlorodifluoromethane, 1-chloro-1,1-difluor-2,2-trifluoro-ethane, octafluorocyclobutane, a mixture of dichlorodifluoromethane and 1,1-difluoroethane, a mixture of chlorodifluoromethane and 1-chloro-1,1-difluoro-2,2,2-trifluoro-ethane, dichlorofluoro-methane, 1-difluoro-2-difluoro-ethane, trichlorofluoro-methane, 1-chlorodifluoro-2-chlorodifluoro-ethane, 2-difluoroethane, 2-fluoro-ethylene, 1-difluoro-2-trifluoro-ethane, trifluoro-methane, carbon tetrafluoride, chlorotrifluoromethane, 1-dichloro-2-difluoro-methane, 1-chlorofluoro-2-difluoroethylene, tetrafluoroethylene, 2-difluoro-ethylene, 2-chlorofluoroethane, and 1-chloro-2-chloro-difluoro-ethane.

There can also be combined in the compositions of the invention modifiers which increase the pleasant effect of the composition on humans. Modifiers are odorants which do not detract from the inhibiting or repellent and anti-mating effect on animals. The odorant should not be one that is attractive to animals, since such an odorant can overcome the repellent effect of the lactone.

It has been determined that the lactone can be combined with up to 50% by weight of an odorant without losing its effectiveness as a repellent and anti-mating agent. Odorants that can be used without deleterious side effects include d-limonene, oil of bergamot, benzaldehyde, methyl salicylate, oil of lemongrass, oil of cloves, and oil of pennyroyal.

The lactones of the invention are applied to the area to be protected, such as the skin of the animal or the surface of the object in an amount that is sufficient to serve as a repellent or to obtain an anti-mating effect for a sufficient length of time. This varies with the animal to be repelled or deterred from mating. In general, an amount on the skin or surface within the range from about 1 to about 100 grams of lactone for each 100 sq. ft. of skin or surface is effective. Larger or smaller amounts can be applied, if desired, although larger amounts are generally unnecessary. The lactones of the invention are relatively nonvolatile, and therefore are longlasting, a small amount being quite sufficient to produce a repellent effect for several days.

The compositions of the invention can be applied both indoors and outdoors, in any type of environment.

The following Examples in the opinion of the inventor represent preferred embodiments of the invention.

EXAMPLE 1

A clear solution is prepared by dissolving 5 parts of γ-undecalactone in 30 parts isopropanol and 65 parts white mineral oil. 20 parts of this concentrate are charged into an aerosol can with 80 parts of a propellant such as a Freon 11/12 mixture (a mixture of trichlorofluoromethane and dichlorodifluoromethane) in a 50:50 ratio. This clear homogeneous solution is completely stable over a period of years.

The can contents can be applied to a female dog in heat at the hindquarters, spraying the hindquarters from a distance of about six inches, for a period of from one to five seconds, with the can delivering one gram of liquid per second. Male dogs are no longer attracted to such a female for a period of several days. The total amount of undecalactone deposited on the skin of the female is estimated to be a maximum of from 10 to 50 mg., assuming that all that has been sprayed is in fact deposited on the dog.

In order to repel a pet animal from an area such as the side of a house or a rug in the home, the area is sprayed evenly from a distance of six to twelve inches. An amount of undecalactone suitable to repel animals is about 1 g. per 100 sq. ft. of area, which is achieved by spraying at the rate of one second per square foot. Larger amounts can be applied if desired, but are generally not necessary. The application lasts for several days, and can then be repeated indefinitely. The effect is not diminished upon repeated applications to the same area.

EXAMPLE 2

Sixty parts of undecalactone are mixed with 40 parts of Tween 80 surfactant polyoxyethylene sorbitan monooleate, resulting in a clear solution. Ten parts of this solution are then added to 1190 parts of water, with gentle stirring. A uniform milk-like emulsion is formed that is stable and does not separate droplets of oil on several days standing. The emulsion contains 0.5 % undecalactone.

This emulsion can be brushed or flowed onto a surface to be protected at a rate of about 2 g. per sq. ft., and forms there an effective pet repellent film that retains its effectiveness for several days. When painted on the hindquarters of a female dog in heat, male dogs are repelled from the female for a period of several days.

EXAMPLE 3

A clear solution is prepared by dissolving 5 parts of a mixture of 67% undecalactone, 10% methyl salicylate, 5% benzaldehyde, 6% oil of bergamot and 12 % d-limonene in 30 parts isopropanol and 65 parts white mineral oil. 20 parts of this concentrate are changed into an aerosol can with 80 parts of a propellant such as a Freon 11/12 mixture (a mixture of trichlorofluoromethane and dichlorodifluoromethane) in a 50:50 ratio. This clear homogeneous solution is completely stable in an aerosol can.

The can contents can be applied to a female dog in heat at the hindquarters, spraying the hindquarters from a distance of about six inches, for a period of from one to five seconds, with the can delivering one gram of liquid per second. Male dogs are no longer attracted to such a female for a period of several days. The total amount of undecalactone deposited on the skin of the female is estimated to be from 10 to 50 mg., assuming that all that has been sprayed is in fact deposited on the dog.

In order to repel a pet animal from an area such as the side of a house or a rug in the home, the area is sprayed evenly from a distance of six to twelve inches. An amount of undecalactone suitable to repel animals is about 1 g. per 100 sq. ft. of area, which is achieved by spraying at the rate of one second per square foot. Larger amounts can be applied if desired, but are not necessary. The application lasts for several days, and can then be repeated indefinitely. The effect is not diminished upon repeated applications to the same area.

EXAMPLE 4

Sixty parts of a mixture of 67% undecalactone, 10% methyl salicylate, 5% benzaldehyde, 6% oil of bergamot and 12% d-limonene are mixed with 40 parts of Tween 80 surfactant polyoxyethylene sorbitan monooleate, resulting in a clear solution. Ten parts of this solution are then added to 1190 parts of water, with gentle stirring. A uniform milk-like emulsion is formed that is stable, and does not separate droplets of oil for several days. The emulsion contains 0.5% of the clear solution indicated above.

This emulsion can be brushed or flowed onto a surface to be protected at a rate of about 2 g. per square foot, and forms an effective pet repellent that retains its effectiveness for several days. When painted on the hindquarters of a female dog in heat, male dogs are repelled from the female for a period of several days.

EXAMPLE 5

A young German shepherd dog was offered over an extended period drinking water that had been treated with one of the ordorants listed in the Table below, in emulsified form. The drinking water contained 0.001% by weight of the odorant. Whether the dog accepted or rejected the water was an indication of whether the odorant was a repellent or an attractant, and the degree of repulsion or attraction was a further indication of its effectiveness in this respect. The tests were repeated a number of times, and consistent results were obtained, as shown below:

TABLE I

| Odorant | Response of Male Dog |
|---|---|
| Undecalactone | Refuses strongly |
| Methyl salicylate | Refuses |
| Oil of cloves | Refuses |
| Oil of pennyroyal | Refuses |
| Caproic acid | Refuses |
| Fatty aldehydes C-8, C-9 | Refuses |
| Thiocresol | Refuses |
| Vanillin | Drinks |
| Musk ambrette | Drinks |
| Oil of anise | Drinks |
| d-Limonene | Drinks some |
| Oil of sassafras | Drinks |
| Oil of lemongrass | Drinks some |

It is apparent from the above results that the undecalactone is the most effective repellent of the group tested. Surprisingly, a number of the compounds proposed as repellents were in fact not very repellent to the dog.

The odorants set forth in the Table above that have been found effective as repellents were then screened for anti-mating properties. Groups of female dogs were treated with estrogenic hormones to produce a simulated heat. All but one animal (serving as a control) were then sprayed on the hindquarters for a few seconds with a spray containing a 5% solution of the odorant in a diluent, after which a male dog was released into the pen. The dog would invariably jump the non-sprayed female, and the anti-mating properties of the odorants being tested were judged by the male dog's behavior towards the sprayed female. The results obtained were as follows:

TABLE II

| Odorant | Response of Male Dog |
|---|---|
| Undecalactone | Pays no attention to female; walks away. |
| Methyl salicylate | Follows female; jumps after a while. |
| Oil of lemongrass | Follows female; sniffs, jumps after a while. |
| Oil of cloves | Licks hindquarters and jumps, same as on control dog. |
| Oil of pennyroyal | Licks hindquarters and jumps, same as on control dog. |
| Caproic acid | Licks hindquarters and jumps, same as on control dog. |
| Fatty aldehydes C-8, C-9 | Licks hindquarters and jumps, same as on control dog. |
| Thiocresol | Licks hindquarters and jumps, same as on control dog. |
| Salicylic Aldehyde | Licks hindquarters and jumps, same as on control dog. |
| Mixture of oil of cloves, oil of pennyroyal, caproic acid, thiocresol, C-8, C-9 fatty aldehydes, and salicyclic aldehyde | Licks hindquarters and jumps, same as on control dog. |

It is apparent from the above results that the only effective compound of the group tested was the undecalactone.

The effectiveness of the undecalactone and the relative ineffectiveness of oil of lemongrass were further confirmed by experiments with female dogs in natural heat and at lower concentrations.

EXAMPLE 6

A clear solution is prepared by dissolving 5 parts of γ-n-amyl-γ-butyrolactone in 30 parts isopropanol and 65 parts white mineral oil. 20 parts of this concentrate are charged into an aerosol can with 80 parts of a propellant such as a Freon 11/12 mixture (a mixture of trichlorofluoromethane and dichlorodifluoromethane) in a 50:50 ratio. This clear homogeneous solution is completely stable over a period of years.

The can contents can be applied to a female dog in heat at the hindquarters, spraying the hindquarters from a distance of about six inches, for a period of from one to five seconds, with the can delivering one gram of liquid per second. Male dogs are no longer attracted to such a female for a period of several days. The total amount of γ-n-amyl-γ-butyrolactone deposited on the skin of the female is estimated to be a maximum of from 10 to 50 mg., assuming that all that has been sprayed is in fact deposited on the dog.

In order to repel a pet animal from an area such as the side of a house or a rug in the home, the area is sprayed evenly from a distance of six to twelve inches. An amount of γ-n-amyl-γ-butyrolactone suitable to repel animals is about 1 g. per 100 sq. ft. of area, which is achieved by spraying at the rate of one second per square foot. Larger amounts can be applied if desired, but are generally not necessary. The application lasts for several days, and can then be repeated indefinitely. The effect is not diminished upon repeated applications to the same area.

EXAMPLE 7

Sixty parts of γ-n-amyl-γ-butyrolactone are mixed with 40 parts of Tween 80 surfactant polyoxyethylene sorbitan monooleate, resulting in a clear solution. Ten parts of this solution are then added to 1190 parts of water, with gentle stirring. A uniform milk-like emulsion is formed that is stable and does not separate droplets of oil on several days standing. The emulsion contains 0.5% γ-n-amyl-γ-butyrolactone.

This emulsion can be brushed or flowed onto a surface to be protected at a rate of about 2 g. per sq. ft., and forms there an effective pet repellent film that retains its effectiveness for several days. When painted on the hindquarters of a female dog in heat, male dogs are repelled from the female for a period of several days.

EXAMPLE 8

A clear solution is prepared by dissolving 5 parts of a mixture of 67% γ-n-amyl-γ-butyrolactone, 10% methyl salicylate, 5% benzaldehyde, 6% oil of bergamot and 12% d-limonene in 30 parts isopropanol and 65 parts white mineral oil. 20 parts of this concentrate are charged into an aerosol can with 80 parts of a propellant such as a Freon 11/12 mixture (a mixture of trichlorofluoromethane and dichlorodifluoromethane) in a 50:50 ratio. This clear homogeneous solution is completely stable in an aerosol can.

The can contents can be applied to a female dog in heat at the hindquarters, spraying the hindquarters from a distance of about six inches, for a period of from one to five seconds, with the can delivering one gram of liquid per second. Male dogs are no longer attracted to such a female for a period of several days. The total amount of γ-n-amyl-γ-butyrolactone deposited on the skin of the female is estimated to be from 10 to 50 mg., assuming that all that has been sprayed is in fact deposited on the dog.

In order to repel a pet animal from an area such as the side of a house or a rug in the home, the area is sprayed evenly from a distance of six to twelve inches. An amount of γ-n-amyl-γ-butyrolactone suitable to repel animals is about 1 g. per 100 sq. ft. of area, which is achieved by spraying at the rate of one second per square foot. Larger amounts can be applied if desired, but are not necessary. The application lasts for several days, and can then be repeated indefinitely. The effect is not diminished upon repeated applications to the same area.

EXAMPLE 9

Sixty parts of a mixture 67% γ-n-amyl-γ-butyrolactone, 10% methyl salicylate, 5% benzaldehyde, 6% oil of bergamot and 12% d-limonene are mixed with 40 parts of Tween 80 surfactant polyoxyethylene sorbitan monooleate, resulting in a clear solution. Ten parts of this solution are then added to 1190 parts of water, with gentle stirring. A uniform milk-like emulsion is formed that is stable, and does not separate droplets of oil for several days. The emulsion contains 0.5% of the clear solution indicated above.

This emulsion can be brushed or flowed onto a surface to be protected at a rate of about 2 g. per square foot, and forms an effective pet repellent that retains its effectiveness for several days. When painted on the hindquarters of a female dog in heat, male dogs are repelled from the female for a period of several days.

EXAMPLE 10

A clear solution is prepared by dissolving 5 parts of δ-n-hexyl-δ-valerolactone in 30 parts isopropanol and 65 parts white mineral oil. 20 parts of this concentrate are charged into an aerosol can with 80 parts of a propellant such as a Freon 11/12 mixture (a mixture of trichlorofluoromethane and dichlorodifluoromethane) in a 50:50 ratio. This clear homogeneous solution is completely stable over a period of years.

The can contents can be applied to a female dog in heat at the hindquarters, spraying the hindquarters from a distance of about six inches, for a period of from one to five seconds, with the can delivering one gram of liquid per second. Male dogs are no longer attracted to such a female for a period of several days. The total amount of δ-n-hexyl-δ-valerolactone deposited on the skin of the female is estimated to be a maximum of from 10 to 50 mg., assuming that all that has been sprayed is in fact deposited on the dog.

In order to repel a pet animal from an area such as the side of a house or a rug in the house, the area is sprayed evenly from a distance of six to twelve inches. An amount of δ-n-hexyl-δ-valerolactone suitable to repel animals is about 1 g. per 100 sq. ft. of area, which is achieved by spraying at the rate of one second per square foot. Larger amounts can be applied if desired, but are generally not necessary. The application lasts for several days, and can then be repeated indefinitely. The effect is not diminished upon repeated applications to the same area.

EXAMPLE 11

Sixty parts of a 1:1:1 mixture of undecalactone, γ-n-amyl-γ-butyrolactone and δ-n-hexyl-δ-valerolactone are mixed with 40 parts of Tween 80 surfactant polyoxyethylene sorbitan monooleate, resulting in a clear solution. Ten parts of this solution are then added to 1190 parts of water, with gentle stirring. A uniform milk-like emulsion is formed that is stable and does not separate droplets of oil on several days standing. The emulsion contains 0.5% lactone mixture.

This emulsion can be brushed or flowed onto a surface to be protected at a rate of about 2 g. per sq. ft., and forms there an effective pet repellent film that retains it effectiveness for several days. When painted on the hindquarters of a female dog in heat, male dogs are repelled from the female for a period of several days.

EXAMPLE 12

A clear solution is prepared by dissolving 5 parts of a mixture of 67% δ-n-hexyl-δ-valerolactone, 10% methyl salicylate, 5% benzaldehyde, 6% oil of bergamot and 12% d-limonene in 30 parts isopropanol and 65 parts white mineral oil. 20 parts of this concentrate are charged into an aerosol can with 80 parts of a propellant such as a Freon 11/12 mixture (a mixture of trichlorofluoromethane and dichlorodifluoromethane) in a 50:50 ratio. This clear homogeneous solution is completely stable in an aerosol can.

The can contents can be applied to a female dog in heat at the hindquarters, spraying the hindquarters from a distance of about six inches, for a period of from one to five seconds, with the can delivering one gram of liquid per second. Male dogs are no longer attracted to such a female for a period of several days. The total amount of δ-n-hexyl-δ-valerolactone deposited on the skin of the female is estimated to be from 10 to 50 mg., assuming that all that has been sprayed is in fact deposited on the dog.

In order to repel a pet animal from an area such as the side of a house or a rug in the home, the area is sprayed evenly from a distance of six to twelve inches. An amount of δ-n-hexyl-δ-valerolactone suitable to repel animals is about 1 g. per 100 sq. ft of area, which is achieved by spraying at the rate of one second per square foot. Larger amounts can be applied if desired, but are not necessary. The application lasts for several days, and can then be repeated indefinitely. The effect is not diminished upon repeated applications to the same area.

EXAMPLE 13

Sixty parts of a mixture of 67% δ-n-hexyl-δ-valerolactone, 10% methyl salicylate, 5% benzaldehyde, 6% oil of bergamot and 12% d-limonene are mixed with 40 parts of Tween 80 surfactant polyoxyethylene sorbitan monooleate, resulting in a clear solution. Ten parts of this solution are then added to 1190 parts of water, with gentle stirring. A uniform milk-like emulsion is formed that is stable, and does not separate droplets of oil for several days. The emulsion contains 0.5% of the clear solution indicated above.

This emulsion can be brushed or flowed onto a surface to be protected at a rate of about 2 g. per square foot, and forms an effective pet repellent that retains its effectiveness for several days. When painted on the hindquarters of a female dog in heat, male dogs are repelled from the female for a period of several days.

EXAMPLE 14

A clear solution is prepared by dissolving 5 parts of a 1:1:1 mixture of γ-undecalactone, γ-n-amyl-γ-butyrolactone, and γ-n-hexyl-δ-valerolactone in 30 parts isopropanol and 65 parts white mineral oil. 20 parts of this concentrate are charged into an aerosol can with 80 parts of a propellant such as a Freon 11/12 mixture (a mixture of trichlorofluoromethane and dichlorodifluoromethane) in a 50:50 ratio. This clear homogeneous solution is completely stable over a period of years.

The can contents can be applied to a female dog in heat at the hindquarters, spraying the hindquarters from a distance of about six inches, for a period of from one to five seconds, with the can delivering one gram of liquid per second. Male dogs are no longer attracted to such a female for a period of several days. The total amount of lactone mixture deposited on the skin of the female is estimated to be a maximum of from 10 to 50 mg., assuming that all that has been sprayed is in fact deposited on the dog.

In order to repel a pet animal from an area such as the side of a house or a rug in the home, the area is sprayed evenly from a distance of six to twelve inches. An amount of lactone mixture suitable to repel animals is about 1g. per 100 sq. ft. of area, which is achieved by spraying at the rate of one second per square foot. Larger amounts can be applied if desired, but are generally not necessary. The application lasts for several days, and can then be repeated indefinitely. The effect is not diminished upon repeated applications to the same area.

EXAMPLE 15

Sixty parts of δ-n-hexyl-δ-valerolactone are mixed with 40 parts of Tween 80 surfactant polyoxyethylene sorbitan monooleate, resulting in a clear solution. Ten parts of this solution are then added to 1190 parts of water, with gentle stirring. A uniform milk-like emulsion is formed that is stable and does not separate droplets of oil on several days standing. The emulsion contains 0.5% δ-n-hexyl-δ-valerolactone.

The emulsion can be brushed or flowed onto a surface to be protected at a rate of about 2 g. per sq. ft., and forms there an effective pet repellent film that retains its effectiveness for several days. When painted on the hindquarters of a female dog in heat, male dogs are repelled from the female for a period of several days.

EXAMPLE 16

A clear solution is prepared by dissolving 5 parts of a mixture of 67% of a 1:1:1 mixture of undecalactone, γ-n-amyl-γ-butyrolactone and δ-n-hexyl-δ-valerolactone, 10% methyl salicylate, 5% benzaldehyde, 6% oil of bergamot and 12% d-limonene in 30 parts isopropanol and 65 parts white mineral oil. 20 parts of this concentrate are charged into an aerosol can with 80 parts of a propellant such as a Freon 11/12 mixture (a mixture of trichlorofluoromethane and dichlorodifluoromethane) in a 50:50 ratio. This clear homogeneous solution is completely stable in an aerosol can.

The can contents can be applied to a female dog in heat at the hindquarters, spraying the hindquarters from a distance of about six inches, for a period of from one to five seconds, with the can delivering one gram of liquid per second. Male dogs are no longer attracted to such a female for a period of several days. The total amount of lactone mixture deposited on the skin of the female is estimated to be from 10 to 50 mg., assuming that all that has been sprayed is in fact deposited on the dog.

In order to repel a pet animal from an area such as the side of a house or a rug in the home, the area is sprayed evenly from a distance of six to twelve inches. An amount of lactone mixture suitable to repel animals is about 1 g. per 100 sq. ft. of area, which is achieved by spraying at the rate of one second per square foot. Larger amounts can be applied if desired, but are not necessary. The application lasts for several days, and can then be repeated indefinitely. The effect is not diminished upon repeated applications to the same area.

While the Examples above show the compounds of the invention to be useful repellents and anti-mating compounds for dogs, they may also be useful repellents for other domestic animals, such as cats, and may be anti-mating, as well. They are useful repellents for animals as a class, both large and small.

The lactones of the invention are long-lasting, and when applied to the skin of the animal and or to surfaces exposed at room temperature to the atmosphere, the odor of the lactones is quite strong and unchanged in odor character even after five days. In comparison, in that time the odor of oil of lemongrass has completely disappeared, and in fact is weak and no longer has a lemon character even after two days. The persistence and odor strength of the lactones of the invention are a considerable economic advantage, inasmuch as fewer applications at lower concentrations will give a satisfactory repellency over extended periods of time.

The odor of the lactones of the invention to humans is pleasant and fruity, somewhat akin to the aroma of peaches. This odor can be rounded out and modified by small additions of other odorants, provided these are not attractants to the animals.

Having regard to the foregoing disclosure the following is claimed as the inventive and patentable embodiments thereof:

1. A process for repelling dogs and cats from a selected area or from each other, which comprises applying to the surface of a selected area, dog or cat to be made repellent an amount sufficient to repel said dog or cat of a compound selected from the group consisting of γ-n-alkyl-γ-butyrolactone and δ-n-alkyl-δ-valerolactone having the formula:

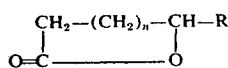

wherein n is a number from 1 to 2, and R is a straight-chain alkyl group having from about two to eight carbon atoms.

2. A process according to claim 1 in which R is a straight-chain alkyl group having from about five to about seven carbon atoms.

3. The process according to claim 1, in which the compound is a γ-n-alkyl-γ-butyrolactone having the formula:

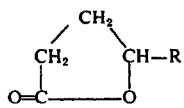

and R is a straight chain alkyl group having from two to eight carbon atoms.

4. The process according to claim 1 in which the compound is a δ-n-alkyl-δ-valerolactone having the formula:

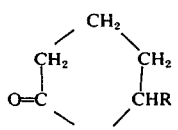

and R is a straight chain alkyl group having two to seven carbon atoms.

5. The process according to claim 1, in which the lactone is γ-n-heptyl-γ-butyrolactone.

6. The process according to claim 1, in which the lactone is γ-n-amyl-γ-butyrolactone.

7. The process according to claim 1, in which the lactone is δ-n-hexyl-δ-valerolactone.

8. The process according to claim 1, in which the lactone is a mixture of γ-n-heptyl-γ-butyrolactone, γ-n-amyl-γ-butyrolactone and δ-n-hexyl-δ-valerolactone.

9. The process according to claim 1, in which the lactone is applied in diluted form in combination with an inert carrier in an amount within the range from about 0.05 to about 10% of the weight of the composition, including the carrier.

10. The process according to claim 1, in which the lactone is applied in an amount within the range from about 1 to about 100 g./100 sq. ft. of surface.

11. The process according to claim 1 for inhibiting mating of dogs, which comprises applying the lactone to the skin of a female dog to be protected from mating by male dogs.

12. The process according to claim 11, in which an amount is applied to the skin within the range from about 1 to about 100 grams of lactone for each 100 sq. ft. of skin.

* * * * *

UNITED STATES PATENT OFFICE
CERTIFICATE OF CORRECTION

Patent No. 3,923,997              Dated December 2, 1975

Inventor(s) Walter C. Meuly

It is certified that error appears in the above-identified patent and that said Letters Patent are hereby corrected as shown below:

| | | |
|---|---|---|
| In the Title, Page 1 | : | before "Process", please insert --A--. |
| In the Title, Page 1 | : | "N-ALKYL" should be --n-ALKYL--. |
| Column 6, line 16 | : | "changed" should be --charged--. |
| Column 6, line 64 | : | "ordorants" should be --odorants--. |
| Column 10, line 29 | : | "it" should be --its--. |

Signed and Sealed this

Twenty-seventh Day of July 1976

[SEAL]

Attest:

RUTH C. MASON
Attesting Officer

C. MARSHALL DANN
Commissioner of Patents and Trademarks